United States Patent [19]
Pauls

[11] Patent Number: 6,025,888
[45] Date of Patent: Feb. 15, 2000

[54] METHOD AND APPARATUS FOR IMPROVED ERROR RECOVERY IN VIDEO TRANSMISSION OVER WIRELESS CHANNELS

[75] Inventor: Richard Joseph Pauls, Newton, N.J.

[73] Assignee: Lucent Technologies Inc., Murray Hill, N.J.

[21] Appl. No.: 08/963,021

[22] Filed: Nov. 3, 1997

[51] Int. Cl.⁷ .................................................. H04N 7/50
[52] U.S. Cl. ...................... 348/845.1; 348/415; 348/416; 348/420
[58] Field of Search ................................ 348/845.1, 400, 348/401, 402, 409, 412, 413, 415, 416, 420; H04N 7/50

[56] References Cited

U.S. PATENT DOCUMENTS

| | | | |
|---|---|---|---|
| 4,731,664 | 3/1988 | Nishiwaki | 348/420 |
| 5,136,378 | 8/1992 | Tsurube | 348/415 |
| 5,825,425 | 10/1998 | Kazui | 348/420 |

*Primary Examiner*—Howard Britton

[57] ABSTRACT

Error recovery is improved in a video transmission system by maintaining, for block positions in a frame, a metric whose value for a given block position is indicative of the relative importance of the given block position in determining decoded video quality. The blocks may be macroblocks configured in accordance with a motion-compensated video compression technique such as MPEG-2. The metric values are used to determine one or more of the block positions which are more likely than other block positions to improve decoded video quality if refreshed. The video signal is then refreshed by transmitting intra-coded blocks for the determined block positions in a given frame. The metric may be based on a count of the number of times a block from a given block position has been coded and transmitted since it was last refreshed, such that the block positions having the highest counts are refreshed. The metric-based selection of refresh blocks ensures that the refresh bits are allocated to the blocks most likely to improve decoded video quality.

24 Claims, 2 Drawing Sheets

METHOD AND APPARATUS FOR IMPROVED ERROR RECOVERY IN VIDEO TRANSMISSION OVER WIRELESS CHANNELS

FIELD OF THE INVENTION

The present invention relates generally to error recovery techniques for use in the transmission of video signals over wireless channels or other error-prone communication channels, and more particularly to adaptive techniques which are suitable for improving error recovery in low bit rate video transmissions.

BACKGROUND OF THE INVENTION

Digital video transmission systems have come into increasingly widespread use with the development of MPEG-2 and other video compression techniques. Motion video signals typically contain a significant amount of intra-frame or "spatial" redundancy as well as inter-frame or "temporal" redundancy. Video compression techniques take advantage of this spatial and temporal redundancy to significantly reduce the amount of information bandwidth required to transmit, store and process video signals. The MPEG-2 standard was developed by the International Standards Organization (ISO) Moving Picture Experts Group (MPEG) and is described in "Information Technology Generic Coding of Moving Pictures and Associated Audio Information: Video," ISO/IEC DIS 13818-2, which is incorporated herein by reference.

MPEG-2 video compression removes spatial redundancy through a process involving discrete cosine transformation, quantization, zig-zag scanning, run-amplitude coding and variable-length coding. Temporal redundancy is removed through a process of inter-frame motion estimation and predictive coding. MPEG-2 frames may be either intra-coded (I) frames, forward-only predictive (P) frames or bidirectionally-predictive (B) frames. An I frame is encoded using only the spatial compression techniques noted above, while a P frame is encoded using "predictive" macroblocks selected from a single reference frame. A given B frame is encoded using "bidirectionally-predictive" macroblocks generated by interpolating between a pair of predictive macroblocks selected from two reference frames, one preceding and the other following the B frame.

Advances in video compression technology have led to the implementation of low bit rate video transmission systems. For example, wireless communication channels such as those found in cellular and personal communication services (PCS) systems are being utilized to deliver digital video signals at low bit rates to subscribers. A significant problem in these and other video transmission systems relates to the effect of channel errors on the quality of the subsequently decoded video. As noted above, MPEG-2 and other video compression techniques use inter-frame predictive coding to reduce temporal redundancy in a sequence of video frames. A channel error which affects a given macroblock in a particular frame can therefore also affect other frames which make use of the given macroblock in predictive coding.

To combat these effects of channel errors, conventional approaches to providing channel error recovery in low bit rate systems involve periodically transmitting intra-coded macroblocks. The intra-coded macroblocks do not depend on any other macroblock from a previous or subsequent frame, and therefore may be used to "refresh" one or more areas of a frame. The periodic transmission of intra-coded macroblocks effectively removes accumulated error effects which may have been associated with previously-transmitted macroblocks. An important limitation of this technique is that the number of bits required to transmit intra-coded macroblocks usually restricts the number of such macroblocks which can be sent for any particular frame. Typical conventional approaches either randomly or sequentially select which macroblocks to send in intra-coded form, such that different macroblock positions may be refreshed for each frame. However, these and other conventional approaches generally fail to identify adequately which macroblocks should be refreshed in order to provide optimal error recovery capability. A need therefore exists for an improved error recovery technique suitable for use with low bit rate video signals transmitted over wireless communication channels.

SUMMARY OF THE INVENTION

The present invention improves error recovery in a video transmission system by maintaining, for block positions in a frame, a metric whose value for a given block position is indicative of the relative importance of the given block position in determining decoded video quality. The blocks may be macroblocks configured in accordance with a motion-compensated video compression technique such as MPEG-2. The metric values are used to determine one or more of the block positions which are more likely than other block positions to improve decoded video quality if refreshed. The video signal is then refreshed by transmitting intra-coded blocks for the determined block positions in a given frame.

In a typical motion-compensated discrete cosine transform (MCDCT) video encoding algorithm such as MPEG, not all blocks are encoded in every frame. Rather, the decision as to whether or not a particular block gets encoded in a particular frame depends on the content and motion of the video scene being processed. Thus, not all blocks are equally utilized and not all blocks are equally important for image fidelity. With this in mind, an exemplary metric in accordance with the invention is based on a count of the number of times a block from a given block position has been coded and transmitted since it was last refreshed, such that the block positions having the highest counts can be refreshed using the available refresh bits. The number of times blocks from a given block position have been coded since the last refresh is indicative of the degree to which a block in that block position, if corrupted in transmission by a channel error, will degrade decoded video quality. Other suitable metrics include the amount of motion in or around the block positions, the relative locations of the block positions, the number of bits required to send the blocks in the block positions, and the gain in signal-to-noise ratio resulting from coding of the blocks in the block positions, as well as various combinations of these and other metrics. The invention may be used with many different types of refresh processes, including refresh processes in which a fixed or variable number of intra-coded blocks are transmitted for each frame or set of frames, or in which the number of intra-coded blocks to be transmitted is based on the available refresh bits.

The metric-based selection of refresh blocks in accordance with the invention ensures that the refresh bits are allocated to the blocks most likely to improve the decoded video quality if refreshed. The invention provides improved error recovery relative to conventional periodic or random refresh techniques, and is suitable for use in a wide variety of video applications, including digital video broadcasting and computer-based or telephony-based multimedia services. These and other features and advantages of the present invention will become more apparent from the accompanying drawings and the following detailed description.

DETAILED DESCRIPTION OF THE INVENTION

The following description will illustrate the invention using an exemplary video signal transmission system. It should be understood, however, that the invention is not limited to use with any particular type of video signal format or transmission system. The invention is instead more generally applicable to any system in which it is desirable to improve the error rate performance of a video signal transmitted in the presence of errors. The term "video signal" should be understood to include signals configured in accordance with standards such as MPEG-2, H.261, H.263 and CCIR-601 as well as other types of video signals. The term "block" as used herein is intended to include not only macroblocks as defined in MPEG-2 and other standards, but more generally any grouping of pixel elements in a video frame or field. The term "refresh" as used herein is intended to include not only transmission of one or more blocks in an intra-coded form, but also other techniques for updating the information associated with a given block.

Figure 1:
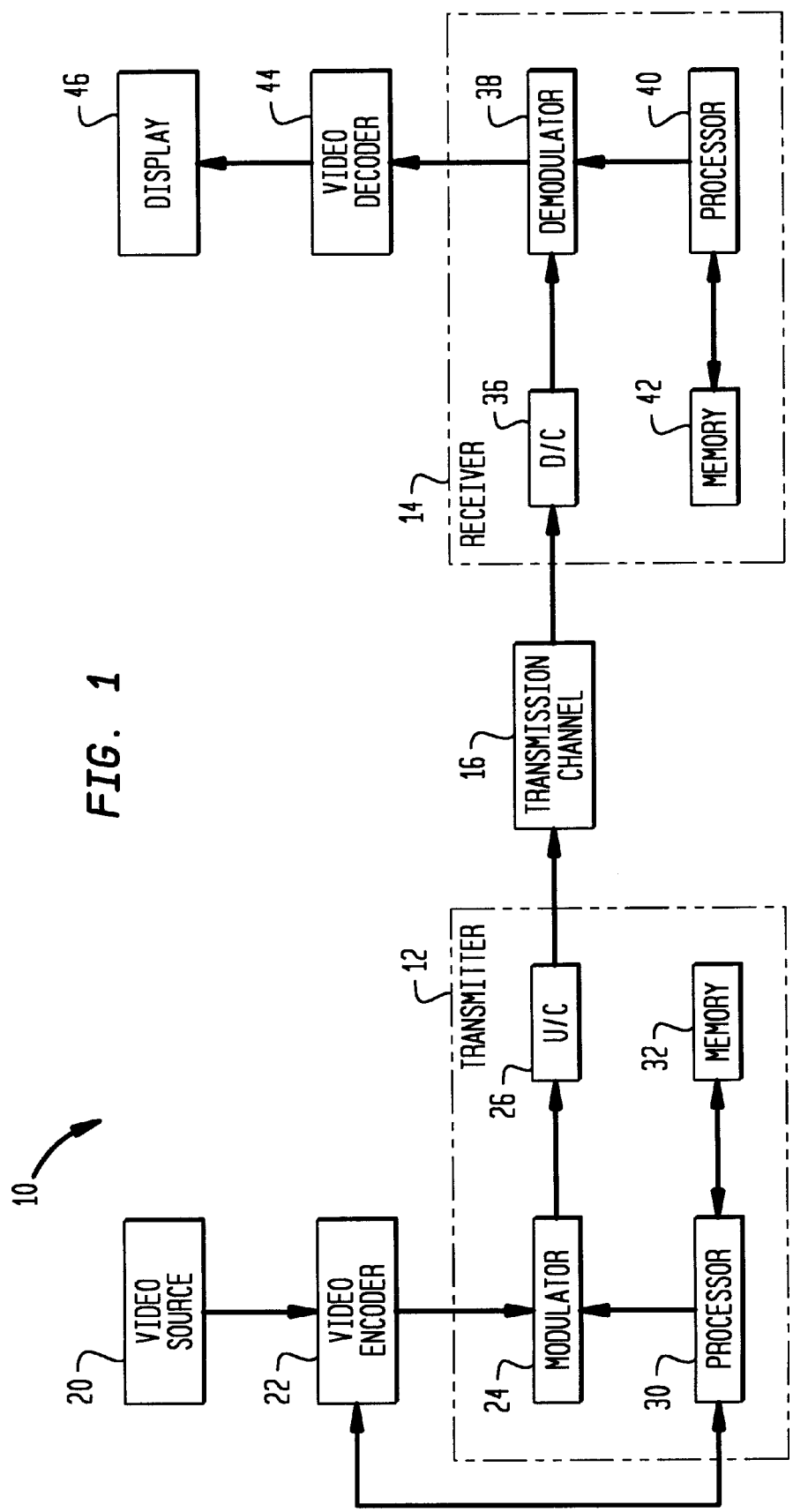
FIG. 1 is a block diagram of a video transmission system configured in accordance with an exemplary embodiment of the invention.

FIG. 1 shows a video transmission system 10 in accordance with an illustrative embodiment of the invention. The system 10 includes a transmitter 12 which communicates with a receiver 14 over a transmission channel 16. The transmitter 12, receiver 14 and transmission channel 16 may be elements of a PCS, cellular or other wireless system. A video source 20 generates a sequence of progressive or interlaced frames to be encoded in accordance with a video compression technique such as MPEG-2. A progressive frame sequence generally has a frame rate of 30 frames per second with a single field in each frame, while an interlaced frame sequence generally includes two fields in each frame and therefore will include 60 fields per second at a 30 frame per second frame rate. The two fields in each frame of the interlaced sequence include an even field corresponding to even scan lines and an odd field corresponding to odd scan lines. The video source 20 may include one or more video cameras, telecine sources, video receivers, digital video disc (DVD) drives, video cassette recorders, other magnetic or optical drives and the like.

A video frame sequence suitable for MPEG-2 encoding may be generated from an NTSC or PAL analog video signal. NTSC video signals utilize 525 scan lines per frame and a frame rate of 30 frames per second, while PAL video signals utilize 625 scan lines per frame and a frame rate of 25 frames per second. The video source 20 may generate an analog NTSC or PAL video signal which is converted to a CIF format with a luminance signal and two chrominance signals and then digitized to provide a digital video signal. The video source 20 may also provide telecine material generated using a 3:2 pulldown technique. A 3:2 pulldown technique converts film having a frame rate of 24 frames per second into a 60 field per second digital video signal. A given MPEG-2 video frame is divided into a plurality of macroblocks, with each macroblock including four 8×8 blocks of luminance samples and either two or four 8×8 blocks of chroma samples.

The digital video signal from the video source 20 is applied to a video encoder 22. The video encoder 22 encodes a sequence of video frames using MPEG-2 or another suitable video compression technique. The output of the encoder 22 is a digital video bit stream representing the original digital video signal. This bit stream is modulated onto a carrier signal in modulator 24 of transmitter 12, and then upconverted to an appropriate transmission frequency in upconverter 26. The transmitter 12 also includes a processor 30 and a memory 32. The processor 30 operates in conjunction with instructions and other information stored in memory 32 to control the operation of the transmitter 12. The processor 30 also operates to control the video encoder 22 such that certain selected macroblocks of a given frame can be sent in intra-coded form in order to provide error recovery, as will be described in greater detail below. The processor 30 may represent a central processing unit, microprocessor, application-specific integrated circuit or other data processing device in a computer, wireless system base station, cable system headend or any other type of video signal transmitter.

The output of the transmitter 12 is delivered via transmission channel 16 to the receiver 14. The receiver 14 includes a downconverter 36 for downconverting the received signal to an appropriate demodulation frequency, and a demodulator 38 for recovering the digital video bit stream from the downconverted signal. The receiver 14 includes a processor 40 and a memory 42 which are used to control the operation of the receiver. The recovered bit stream is delivered to a video decoder 44. The decoder 44 decodes the bit stream to generate a video signal which is supplied to a display 46. In other embodiments, the video signal from decoder 44 may be directed to a memory or other storage device, such that the signal may subsequently be retrieved and supplied to the display 46. The processor 40 may represent a central processing unit, microprocessor, application-specific integrated circuit or other data processing device in a computer, wireless system mobile station, television set-top box or any other type of video signal receiver.

Error recovery in accordance with the invention may be provided in the system 10 by transmitting selected macroblocks of the video frames in an intra-coded form. As noted previously, intra-coded macroblocks do not depend on any other macroblock from a previous or subsequent frame, and therefore effectively remove accumulated error effects which may have been associated with previously-transmitted macroblocks. Unlike the above-noted conventional error recovery techniques, which may randomly select macroblocks for intra-coded transmission, the techniques of the present invention select for intra-coded transmission those macroblocks which are predicted to be most likely to improve the decoded image quality. The invention makes use of one or more "sensitivity" metrics which provide a measure of the relative importance of a particular macroblock position in terms of its impact on decoded video image quality. The metric may include a value which is maintained for each macroblock position, such that the macroblock positions may be ranked based on the metric values. The values may then be used to determine which macroblock position is likely to benefit most from an intra-coded transmission during refresh. The limited number of bits available for refreshing a given video frame can therefore be allocated for intra-coded transmission of those macroblocks which, based on the metric values, are most important in terms of decoded image quality. This metric-based approach to selecting macroblocks for refresh provides considerable advantages over random selection and other conventional techniques.

Figure 2:
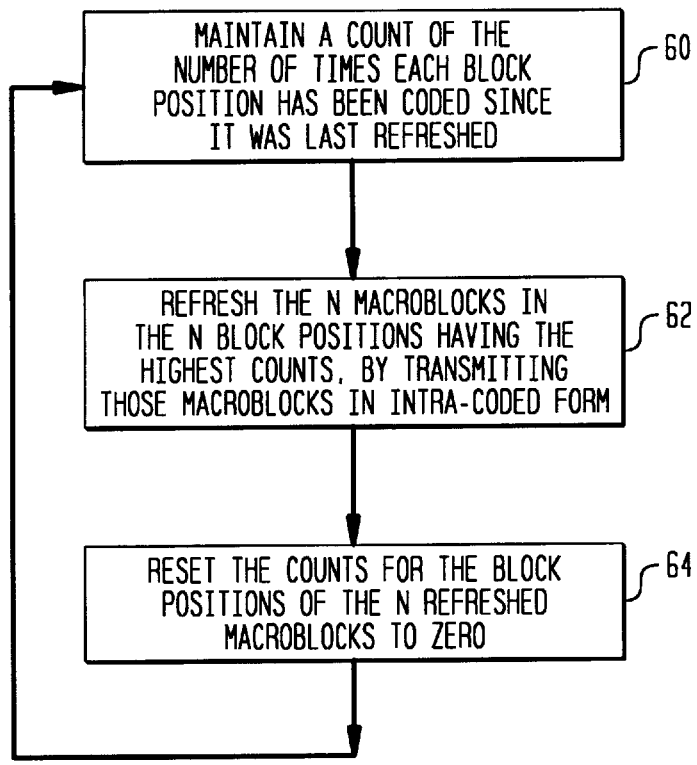
FIG. 2 is a flow diagram illustrating an adaptive leakage process which may be implemented in the system of FIG. 1 to provide improved error recovery.

FIG. 2 shows a flow diagram illustrating an exemplary embodiment of metric-based refresh selection in accordance with the invention. In this embodiment, the metric is the number of times a particular macroblock position has been coded since it was last refreshed, or in other words, the number of times macroblocks in the particular position have been coded since a macroblock in that position was last sent in intra-coded form. The metric is based on the fact that there is a possibility of error each time a macroblock in a given macroblock position is coded and transmitted. As a result, a macroblock position with a higher number of coding operations than another macroblock position has a greater potential for error and therefore a greater importance in determining decoded video image quality.

Step 60 of FIG. 2 indicates that the metric values are generated by maintaining a count of the number of times each macroblock position has been coded since it was last refreshed. This count may be maintained in, for example, the memory 32 of transmitter 12 under the direction of the processor 30. It will be assumed for this example that a decision has been made to refresh N macroblocks in each frame of the video signal. In step 62, the N macroblocks in the macroblock positions having the highest counts are refreshed by transmitting those macroblocks in intra-coded form. The counts associated with the refreshed macroblock positions are then reset to zero, as shown in step 64. The process then returns to the count maintenance step 60 until the next refresh period. The process of FIG. 2 ensures that the macroblock positions which have been coded the most times since the last refresh will be refreshed first. These macroblock positions correspond generally to areas of high activity within the video frames. The repeated coding of macroblocks in these positions makes the macroblocks more susceptible to the cumulative degenerative effects of channel errors, and so refreshing these macroblocks first will result in a greater improvement in decoded video image quality.

Figure 3:
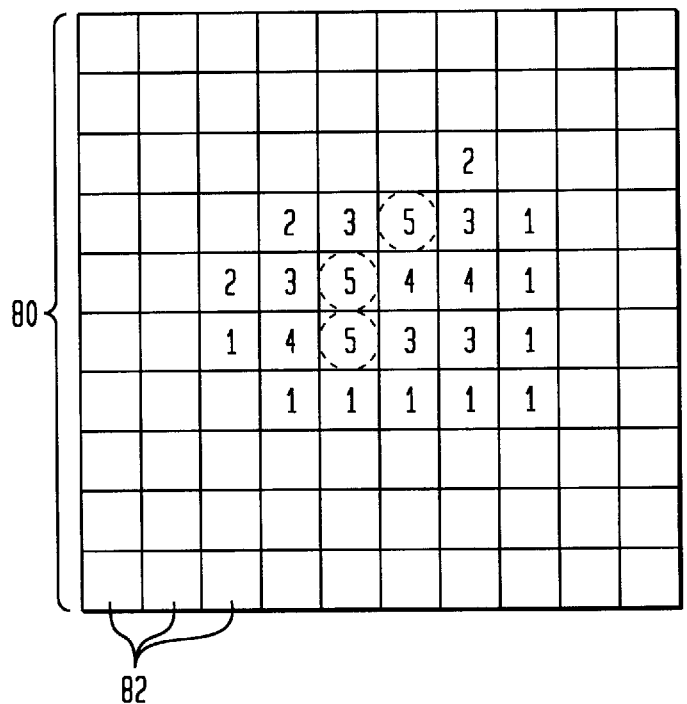
FIG. 3 illustrates the operation of the process of FIG. 2 and shows a set of counts associated with different macroblock positions in a portion of a video signal frame.

FIG. 3 shows a portion 80 of a video frame illustrating the counts associated with different macroblock positions 82 at a given point in time in the process of FIG. 2. Certain of the macroblock positions 82 in FIG. 3 include a number indicating the value of the count associated with that macroblock position at the given point in time. Macroblock positions without numbers are assumed to have a count of zero. If we assume that N=3 macroblocks will be refreshed for each frame, application of step 62 of the FIG. 2 process to the counts shown in FIG. 3 will result in the three macroblock positions with a count of five being selected for refresh. The counts of these macroblock positions are circled in FIG. 3. The three macroblocks of the current frame associated with the three selected macroblock positions are then transmitted in intra-coded form to provide the refresh, and the counts for the three positions are reset to zero in accordance with step 64 of the FIG. 2 process.

Alternative embodiments of the invention may make use of a variety of other types of metrics which are indicative of the relative importance of macroblocks to decoded video image quality. These alternative metrics include, for example, the amount of motion detected in and around a macroblock, the location of a macroblock in a frame, the number of bits required to transmit the macroblock, the gain in signal-to-noise ratio attributable to coding of the macroblock, and the ratio of the gain in signal-to-noise ratio to the number of bits required to transmit the macroblock. These and other metrics may be used alone or in various combinations to provide relative measures of macroblock importance in accordance with the invention.

Additional alternative embodiments of the invention can use a refresh process other than that used in the illustrative embodiment of FIG. 2. For example, instead of refreshing a fixed number of macroblocks per frame as in step 62 of FIG. 2, the invention could be implemented using a process that refreshes a variable number of macroblocks per frame, a fixed number of macroblocks per set of frames, or a number of macroblocks which is determined based on the availability of bits. It should also be noted that although the processor 30 and memory 32 of transmitter 12 are used to implement the process steps of FIG. 2 in the illustrative embodiment, other embodiments may utilize a processor and memory within the encoder 22 to implement the process steps, various combinations of processing and memory elements from the transmitter and the encoder, or other types of processing and memory external to the transmitter and encoder.

The error recovery techniques of the present invention are particularly well-suited for use with video transmissions over error-prone channels such as the IS-95 personal communications service (PCS) and cellular code division multiple access (CDMA) systems. However, the invention may be utilized with numerous other types of communication systems, including global computer networks such as the Internet, wide area networks, local area networks, cable systems, satellite systems and standard wired telephone networks. The invention is also suitable for use in systems based on techniques such as switched digital video (SDV), hybrid fiber/coax (HFC), direct broadcast satellite (DBS), multichannel multipoint distribution service (MMDS) and digital subscriber loop (DSL). Furthermore, the invention can be utilized with a variety of different video coding standards, including the above-described MPEG-2 standard, the H.261 CCITT standard for video coding and decoding as described in Draft Revised Recommendation H.261, "Video Code, for Audiovisual Services at p×64 kbit/s," CCITT Study Group XV, Report R 95, May 1992, and the H.263 CCITT standard for very low bit rate video encoding below 64 kbit/s, which are incorporated by reference herein.

The above-described embodiments of the invention are intended to be illustrative only. Numerous other alternative embodiments within the scope of the following claims will be apparent to those skilled in the art.

What is claimed is:

1. A method of transmitting a video signal including a sequence of frames, each of the frames including a plurality of blocks occupying block positions, the method comprising:

determining one or more of the block positions which are more likely than other block positions to improve decoded video quality if refreshed; and refreshing the video signal by transmitting one or more intra-coded blocks associated with the determined block positions in a given frame.

2. The method of claim 1 wherein the blocks are macroblocks configured in accordance with a motion-compensated video compression technique.

3. The method of claim 1 wherein the determining step includes the step of maintaining a count of the number of times a block from a given block position has been coded and transmitted since it was last refreshed, wherein the one or more block positions which are more likely than other block positions to improve decoded video quality include the block positions having the highest counts.

4. The method of claim 1 wherein the determining step includes the step of determining the amount of motion in or around the block positions, wherein the one or more block positions which are more likely than other block positions to improve decoded video quality include the block positions having the greatest amount of motion.

5. The method of claim 1 wherein the determining step includes the step of determining the location of the blocks in the image.

6. The method of claim 1 wherein the determining step includes the step of determining the number of bits required to send the blocks in the block positions, wherein the one or more block positions which are more likely than other block positions to improve decoded video quality include the block positions which have the greatest numbers of bits associated therewith.

7. The method of claim 1 wherein the determining step includes the step of determining the gain in signal-to-noise ratio resulting from coding of the blocks in the block positions, wherein the one or more block positions which are more likely than other block positions to improve decoded video quality include the block positions having the greatest gains in signal-to-noise ratio.

8. The method of claim 1 wherein the determining step includes the step of determining the number of bits required to send the blocks in the block positions, and the gain in signal-to-noise ratio resulting from coding of the blocks in the block positions, wherein the one or more block positions which are more likely than other block positions to improve decoded video quality include the block positions which have associated therewith the largest ratio of gain in signal-to-noise ratio to number of bits.

9. The method of claim 1 wherein the refreshing step includes refreshing N block positions which are the most likely to improve decoded video quality by transmitting N intra-coded blocks, wherein each of the N intra-coded blocks is associated with one of the N block positions.

10. The method of claim 1 wherein the refreshing step includes periodically refreshing the video signal by transmitting N intra-coded blocks for each frame of the video signal.

11. The method of claim 1 wherein the refreshing step includes periodically refreshing the video signal by transmitting N intra-coded blocks for each of a set of frames of the video signal.

12. The method of claim 1 wherein the refreshing step includes periodically refreshing the video signal by transmitting the intra-coded blocks when a sufficient number of bits become available.

13. An apparatus for use in transmitting a video signal including a sequence of frames, each of the frames including a plurality of blocks occupying block positions, the apparatus comprising:

a processor operative to determine one or more of the block positions which are more likely than other block positions to improve decoded video quality if refreshed, and to refresh the video signal by directing the transmittal of one or more intra-coded blocks associated with the determined block positions in a given frame; and a memory for storing, for at least a subset of the block positions, values which are indicative of the likelihood of the block positions to improve decoded video quality if refreshed.

14. The apparatus of claim 13 wherein the blocks are macroblocks configured in accordance with a motion-compensated video compression technique.

15. The apparatus of claim 13 wherein the processor is further operative to maintain a count of the number of times a block from a given block position has been coded and transmitted since it was last refreshed, wherein the one or more block positions which are more likely than other block positions to improve decoded video quality include the block positions having the highest counts.

16. The apparatus of claim 13 wherein the processor is further operative to determine the amount of motion in or around the block positions, and wherein the one or more block positions which are more likely than other block positions to improve decoded video quality include the block positions having the greatest amount of motion.

17. The apparatus of claim 13 wherein the processor is further operative to determine the location of the blocks in the image.

18. The apparatus of claim 13 wherein the processor is further operative to determine the number of bits required to send the blocks in the block positions, and wherein the one or more block positions which are more likely than other block positions to improve decoded video quality include the block positions which have the greatest numbers of bits associated therewith.

19. The apparatus of claim 13 wherein the processor is further operative to determine the gain in signal-to-noise ratio resulting from coding of the blocks in the block positions, and wherein the one or more block positions which are more likely than other block positions to improve decoded video quality include the block positions having the greatest gains in signal-to-noise ratio.

20. The apparatus of claim 13 wherein the processor is further operative to determine the number of bits required to send the blocks in the block positions, and the gain in signal-to-noise ratio resulting from coding of the blocks in the block positions, wherein the one or more block positions which are more likely than other block positions to improve decoded video quality include the block positions which have associated therewith the largest ratios of gain in signal-to-noise ratio to number of bits.

21. The apparatus of claim 13 wherein the processor is further operative to refresh N block positions which are the most likely to improve decoded video quality by transmitting N intra-coded blocks, wherein each of the N intra-coded blocks is associated with one of the N block positions.

22. The apparatus of claim 13 wherein the processor is further operative to periodically refresh the video signal by transmitting N intra-coded blocks for each frame of the video signal.

23. The apparatus of claim 13 wherein the processor is further operative to periodically refresh the video signal by transmitting N intra-coded blocks for each of a set of frames of the video signal.

24. The apparatus of claim 13 wherein the processor is further operative to periodically refresh the video signal by transmitting the intra-coded blocks when a sufficient number of bits become available.

* * * * *